United States Patent [19]
Sato et al.

[11] Patent Number: 5,699,364
[45] Date of Patent: Dec. 16, 1997

[54] DATA COMMUNICATION SYSTEM, APPARATUS AND METHOD WHICH OPTIMIZE THE SET VALUE OF PARAMETERS

[75] Inventors: Hiroaki Sato, Chouhu; Katsumi Yamagishi, Hino, both of Japan

[73] Assignee: Kabushiki Kaisha Toshiba, Kanagawa, Japan

[21] Appl. No.: 616,565

[22] Filed: Mar. 15, 1996

[30] Foreign Application Priority Data

Mar. 16, 1995 [JP] Japan .................. 7-057588
Mar. 16, 1995 [JP] Japan .................. 7-057590

[51] Int. Cl.$^6$ .................................. G06F 11/00
[52] U.S. Cl. .................. 371/5.5; 371/38.1; 371/44; 395/183.17; 364/265.1; 364/268; 364/944; 364/944.5
[58] Field of Search ............. 371/5.1, 5.5, 38.1, 371/39.1, 43, 44, 45, 37.1; 364/265, 265.1, 265.2, 266, 944.9, 944.5, 942.7, 268, 268.3, 268.8, 943.91, 944, 944.3; 395/185.01, 185.02, 185.1, 181, 183.16, 183.17

[56] References Cited

U.S. PATENT DOCUMENTS

| | | | |
|---|---|---|---|
| 4,309,771 | 1/1982 | Wilkens | 371/5.5 |
| 4,701,923 | 10/1987 | Fukasawa et al. | 371/5.5 |
| 4,720,829 | 1/1988 | Fukusawa et al. | 371/5.5 |
| 4,764,927 | 8/1988 | Izumita et al. | 371/38.1 |
| 5,128,965 | 7/1992 | Henriksson | 371/5.5 |
| 5,153,527 | 10/1992 | Yaguchi | 329/307 |

*Primary Examiner*—Robert W. Beausoliel, Jr.
*Assistant Examiner*—Trinh L. Tu
*Attorney, Agent, or Firm*—Finnegan, Henderson, Farabow, Garrett & Dunner, L.L.P.

[57] ABSTRACT

A data communication system in which parameter values for data communication can be set at optimum values for data errors. When receiving data formed in a frame structure, the receiving terminal finds the number of errors in the received data. When failing to detect the number of errors, it calculates an approximation of the number of errors from a past error rate. The receiving terminal also calculates an error rate on the basis of the number of errors or the approximation therefor and informs the calculated error rate to a transmitting terminal. The transmitting terminal changes the set values of parameters including frame length of data of the frame structure to be transmitted on the basis of the informed error rate. The receiving terminal finds the number of burst errors generated within the received data, calculates a random error number by subtracting the burst error number from the total error number, and informs the transmitting terminal of the random error number, while the transmitting terminal changes the set values of parameters including frame length of the frame-structured data to be transmitted on the basis of the informed random error number.

32 Claims, 10 Drawing Sheets

DATA COMMUNICATION SYSTEM, APPARATUS AND METHOD WHICH OPTIMIZE THE SET VALUE OF PARAMETERS

BACKGROUND OF THE INVENTION

1. Field of the Invention

The present invention relates to a data communication system which performs communication by transmitting and receiving data formed in a frame structure, and more particularly, to a data communication system capable of changing the set values of parameters including the number of continuous transmission frames and the length of a data frame in response to errors in data communication and also to a method employed in the system.

2. Description of the Related Art

It is known that, in a data communication system which performs communication by transmitting and receiving data of a frame structure, the communication speed is theoretically maximum when by employing a data frame length corresponding to an error rate on a communication line, thus enabling efficient data communication.

To this end, the prior art data communication system is designed to detect the number of errors occurred in a data frame with the use of an error correction code and calculate an error rate on a communication line based on the detected number of errors, and to change the set values of parameters including data frame length according to the calculated error rate.

However, the number of errors correctable with the error correction code are limited by the error correcting ability of the error correction code. Accordingly, the prior art data communication system has had a problem that, when the number of errors occurred in the data frame exceeds the error correction ability of the error correction code, it is not only impossible to correct the errors but also impossible to find the number of such errors. As a result, it is impossible to change the values of parameters including data frame length into appropriate ones.

Also known in this type of data communication system is that there are two types of data errors; burst errors which generate in concentrated manner in certain periods and random errors which generate regularly.

In the prior art data communication system, when the burst errors were generated, the values of parameters including data frame length were changed based on the burst errors. As a result, it was impossible to optimize the parameters.

SUMMARY OF THE INVENTION

It is a first object of the present invention to provide data communication system and method capable of setting the optimum values of parameters even when the number of errors generated cannot be detected due to inferior error correction ability of the error correction code, etc.

A second object of the present invention is to provide a data communication system and method capable of setting appropriate values of parameters independent of a burst error when the burst error occurs.

In accordance with an aspect of the present invention, the above objects are attained by providing a data communication system comprising a transmitting terminal for transmitting data of a frame structure, and a receiving terminal connected to the transmitting terminal through a communication line, for receiving the frame-structured data from the transmitting terminal, the receiving terminal comprising error number detection means for detecting the number of data errors from the frame-structured data received from the transmitting terminal; and error number estimation means for estimating the number of data errors when the error number detection means fails to detect the number of data errors, and the transmitting terminal comprising parameter change means for changing parameters of the frame-structured data on the basis of the detected number of data errors when the error number detection means detects the number of data errors or on the basis of the number of data errors estimated by the error number estimation means when the error number detection means fails to detect the number of data errors.

In the present invention, the communication line may be radio communication channels.

The error number estimation means estimates the number of data errors on the basis of an error rate of data previously received when the error number detection means fails to detect the number of data errors.

The error number estimation means comprises error rate memory means for storing an error rate of data previously received; and error number estimation means for estimating the number of data errors on the basis of the error rate of the previously-received data stored in the error number memory means when the error number detection means fails to detect the number of data errors.

The receiving terminal further comprises error rate calculation means for calculating the error rate on the basis of the detected number of data errors when the error number detection means detects the number of data errors, and for calculating the data error rate on the basis of the number of data errors estimated by the error number estimation means when the error number detection means fails to detect the number of data errors; and error rate transmission means for transmitting the data error rate calculated by the error rate calculation means to the transmitting terminal, and wherein the parameter change means comprising means for changing parameters of data to be transmitted on the basis of the error rate of the data transmitted from the error rate transmission means.

The receiving terminal further comprises error rate calculation means for calculating the data error rate on the basis of the number of data errors when the error number detection means detects the number of data errors, and for calculating the data error rate on the basis of the number of data errors estimated by the error number estimation means when the error number detection means fails to detect the number of data errors; parameter calculation means for calculating parameter values of data of the frame structure to be transmitted from the transmitting terminal on the basis of the data error rate calculated by the error rate calculation means; and parameter transmission means for transmitting the parameter values calculated by the parameter calculation means to the transmitting terminal, and wherein the parameter change means comprises means for changing parameters of data to be transmitted from the transmitting terminal on the basis of the parameter values transmitted from the parameter transmission means.

The error number detection means comprises random error detection means for detecting the number of random errors excluding burst errors from the frame-structured data received from the transmitting terminal, and wherein the parameter change means comprises means for changing parameters of data of the frame structure to be transmitted on the basis of the random error number detected by the random error detection means.

In this case, the random error detection means comprises total error number calculation means for calculating a total error number from the frame-structured data received from the transmitting terminal; burst error calculation means for calculating the number of burst errors from the frame-structured data received from the transmitting terminal; and random error calculation means for calculating the random error number by subtracting the burst error number detected by the burst error number calculation means from the total error number calculated by the total error number calculation means.

The burst error number calculation means detects start of burst error when a predetermined number of error bits are successively detected in the frame-structured data received from the transmitting terminal, detects end of the burst error when a predetermined number of correct bits in the frame-structured data successively detected, and determines the number of error bits within a duration from the start of burst error to the end of the burst error as the burst error number.

In accordance with another aspect of the present invention, a data communication system comprises a transmitting terminal for transmitting data of a frame structure, and a receiving terminal connected to the transmitting terminal through a communication line, for receiving the frame-structured data from the transmitting terminal, the receiving terminal comprising random error detection means for detecting random errors excluding burst errors from the frame-structure data received from the transmitting terminal, the transmitting terminal comprising parameter change means for changing parameters of data of the frame structure to be transmitted on the basis of the random errors detected by the random error detection means of the receiving terminal.

The communication line may be radio communication channels.

Further, the random error detection means comprises total error number calculation means for calculating a total error number from the frame-structured data received from the transmitting terminal burst error calculation means for calculating the number of burst errors from the frame-structured data received from the transmitting terminal; and random error calculation means for calculating the random error number by subtracting the burst error number detected by the burst error number calculation means from the total error number calculated by the total error number calculation means.

The burst error number calculation means detects start of burst error when a predetermined number of error bits are successively detected in the frame-structured data received from the transmitting terminal, detects end of the burst error when a predetermined number of correct bits in the frame-structured data successively detected, and determines the number of error bits within a duration from the start of burst error to the end of the burst error as the burst error number.

The receiving terminal further comprises burst error number transmission means for transmitting the burst error number calculated by the random error number calculation means to the transmitting terminal, and wherein the parameter change means comprises burst error number reception means for receiving the burst error number transmitted by the burst error number transmission means; parameter calculation means for calculating parameter values of data of the frame structure transmitted from the transmitting terminal on the basis of the burst error number received by the burst error number reception means; and change means for changing parameters of the frame-structured data transmitted by the transmitting terminal on the basis of the parameter values calculated by the parameter calculation means.

Furthermore, the receiving terminal further comprises parameter calculation means for calculating parameter values of data of the frame structure transmitted from the transmitting terminal on the basis of the burst error number calculated by the random error number calculation means; and parameter transmission means for transmitting the parameter values calculated by the parameter calculation means to the transmitting terminal, and wherein the parameter change means comprises means for changing the parameters of the frame-structured data transmitted from the transmitting terminal on the basis of the parameter values transmitted by the parameter transmission means.

In accordance with a further aspect of the present invention, a data communication method in a data communication system for performing communication of data of a frame structure between a first terminal of a data transmitter side and a second terminal of a data receiver side through a communication line comprises in the first terminal, the steps of detecting the number of data errors in the frame-structured data transmitted from the transmitting terminal; and estimating the number of data errors from an error rate of data previously received when the number of data errors is not detected, and comprises, in the second terminal, the step of changing parameters of data of the frame structure to be transmitted on the basis of the detected number of data errors when the number of data errors is detected by the receiving terminal and on the basis of the estimated number of data errors when the number of data errors is not detected by the receiving terminal.

In accordance with yet further aspect, a data communication method in a data communication system for performing communication of data of a frame structure between a first terminal of a data transmitter side and a second terminal of a data receiver side through a communication line, comprises the steps of detecting a random error number by subtracting the number of burst errors generated on a burst basis from the total number of errors generated in the frame-structured data transmitted from the transmitting terminal in the second terminal; and changing parameters of the frame-structured data on the basis of the random error number detected at the second terminal in the first terminal.

DESCRIPTION OF THE PREFERRED EMBODIMENTS

The embodiments of the present invention will be described while referring to the accompanying drawings.

Figure 1:
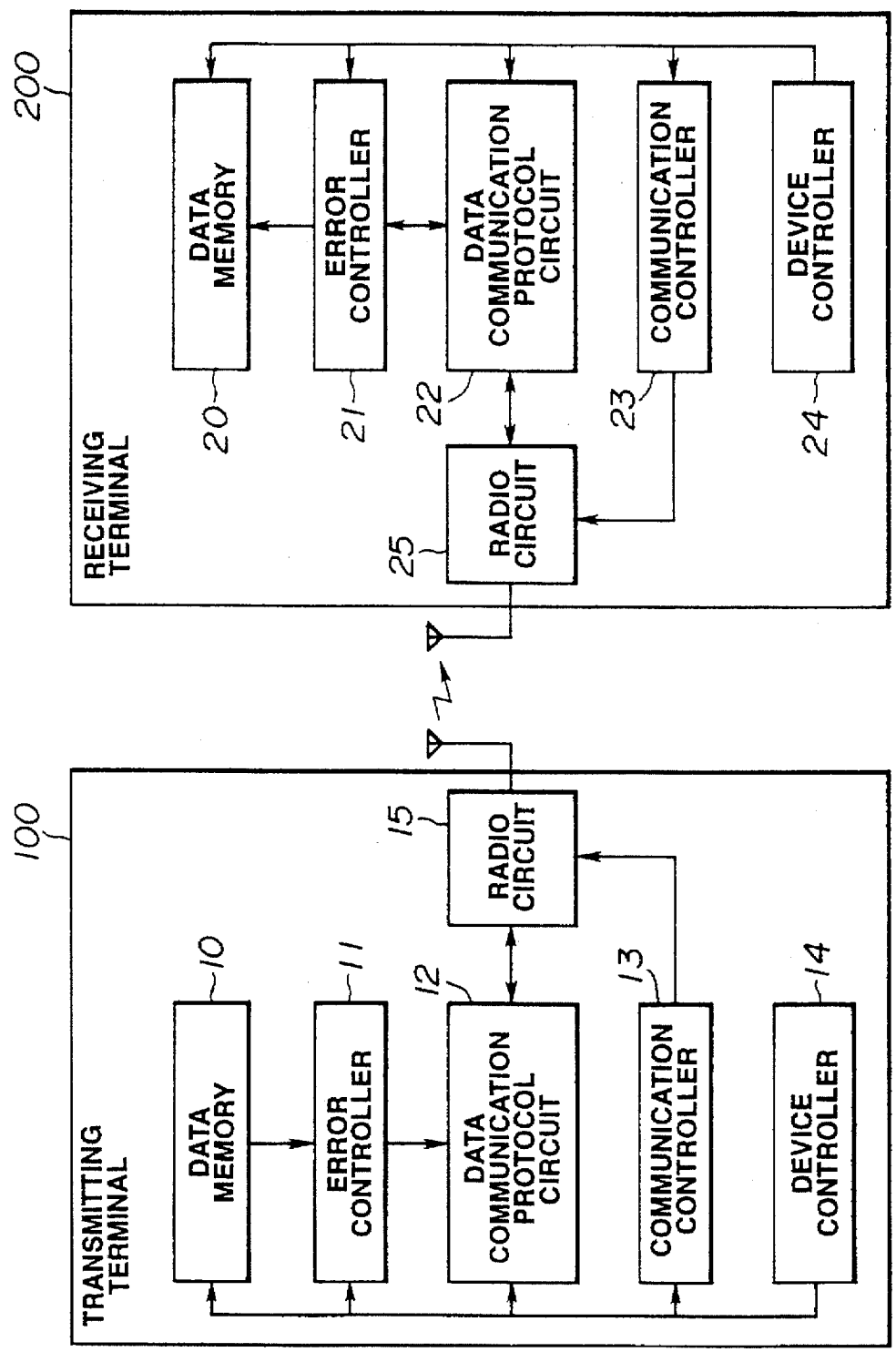
FIG. 1 is a block diagram of a data communication system in accordance with the present invention.

Referring to FIG. 1, the data communication system includes a transmitting terminal 100 and a receiving terminal 200 connected to the transmitting terminal 100 through radio communication channels as a communication line.

The transmitting terminal 100 has a data memory 10, an error controller 11, a data communication protocol circuit 12, a communication controller 13, a device controller 14, and a radio circuit 15.

In the illustrated example, the data memory 10 stores data to be transmitted to the receiving terminal 200. The data stored in the data memory 10 include voice data input from a microphone (not shown) or the like and data input from external devices (not shown).

In transmitting the data stored in the data memory 10 to the receiving terminal 200, the error controller 11 performs controlling operations in which an error correction code is generated and attached to the data.

The data communication protocol circuit 12 performs framing operations and executes a predetermined communication procedure to transmit the data attached with the error correction code by the error controller 11. In this example, the data communication protocol circuit 12 is so constructed as to change the set values of parameters including the number of frames successively transmitted and data frame length. For the purpose of accomplishing the optimum communication environment, the data communication protocol circuit 12 changes the set values of parameters according to the error rate, the number of errors, parameter values, etc. informed by the receiving terminal 200, which will be described later in detail.

The communication controller 13 controls the radio circuit 15 in such a manner as to establish a radio link with the receiving terminal 200 and, in terminating the data communication, to disconnect the established radio link from the receiving terminal 200.

The device controller 14 carries out control operations over the entire transmitting terminal 100.

The receiving terminal 200, on the other hand, has a data memory 20, an error controller 21, a data communication protocol circuit 22, a communication controller 23, a device controller 24, and a radio circuit 25.

In the illustrated example, the data memory 20 stores data received from the transmitting terminal 100. The data stored in the data memory 20 include voice data which is to be transmitted to a loudspeaker (not shown) and other data which is to be transmitted to output devices (not shown).

The error controller 21 performs error correcting and detecting operations based on the error correction code attached by the error controller 11 of the transmitting terminal 100. The error controller 21 also performs detection and estimation of the number of errors, and calculation of an error rate, the number of errors, parameter values, etc. to be informed to the transmitting terminal 100, which will be detailed later.

The data communication protocol circuit 22 carries out frame analysis of the received data, generation of frames for the received data, execution of the predetermined communication procedure.

The communication controller 23 controls the radio circuit 25 in such a manner as to establish a radio link with the transmitting terminal 100 and, in terminating the data communication, to disconnect the radio link from the receiving terminal 200.

The device controller 24 performs general control operations over the receiving terminal 200.

Figure 2:
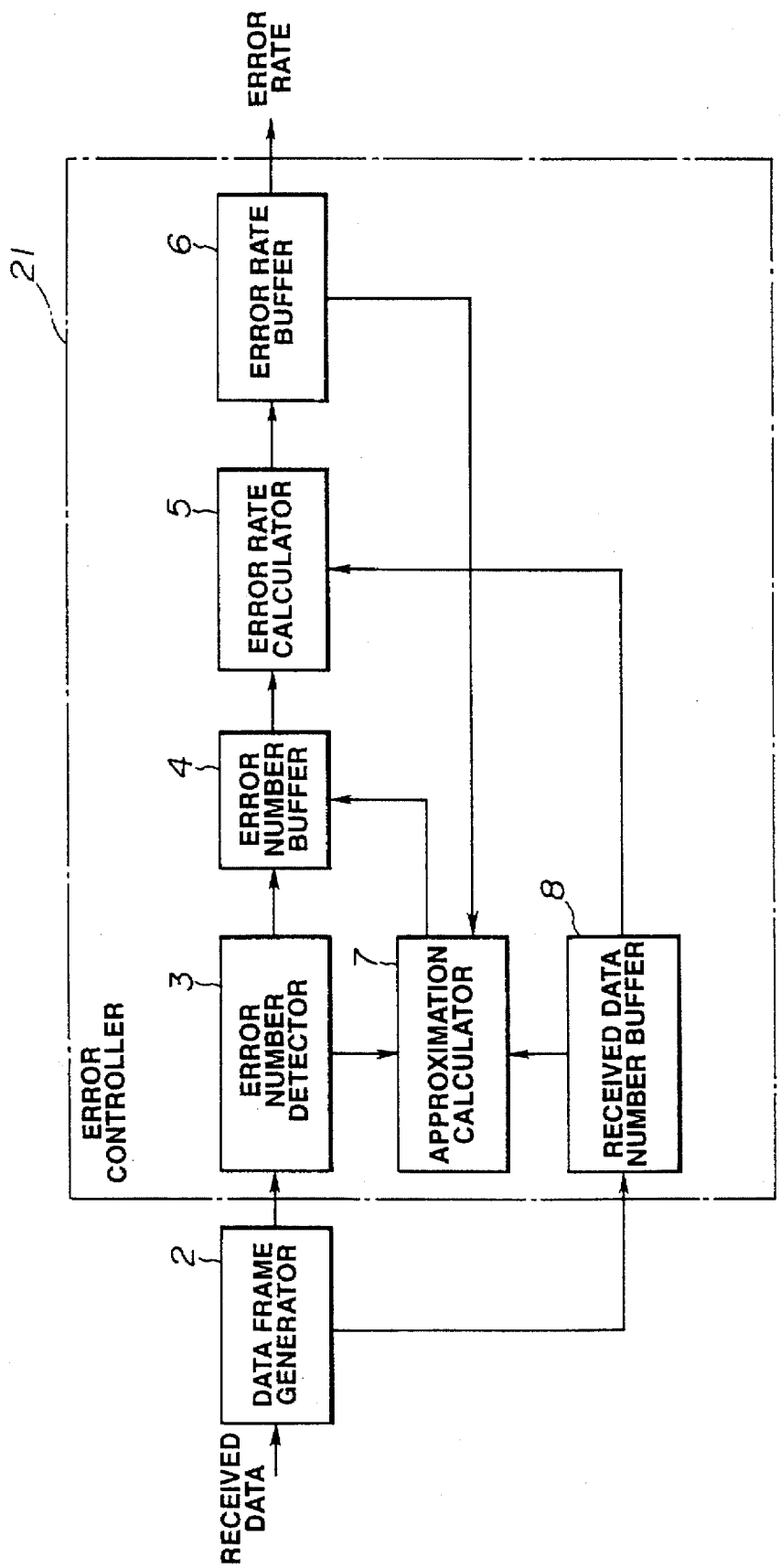
FIG. 2 is a block diagram of an error controller in a receiving terminal of the data communication system in FIG. 1.

Shown in FIG. 2 is a detailed structure of the error controller 21 in the receiving terminal 200 of FIG. 1.

In the receiving terminal 200, the data received at the radio circuit 25 from the transmitting terminal 100 is sent to the data communication protocol circuit 22, which in turn analyzes the received data and generates the same data frame as that generated at the error controller of the transmitting terminal 100.

Data frame 300 is generated by a data frame generator 2 provided in the data communication protocol circuit 22.

Figure 3:
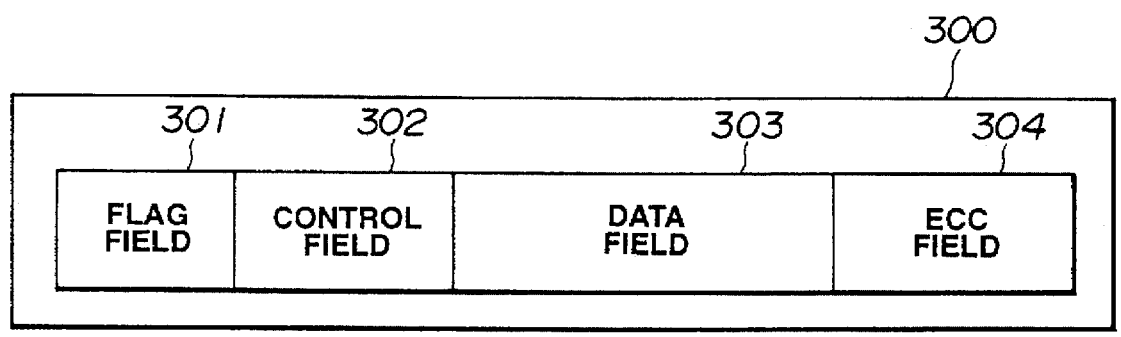
FIG. 3 shows an example of the structure of a frame generated by the data frame generator of the error controller in FIG. 2.

The data frame 300 is made up of a flag field 301, a control field 302, a data field 303 and an ECC field 304, as shown in FIG. 3.

More specifically, the data frame generator 2 sets a bit train indicative of the head of the data frame at the flag field 301, and sets a bit train indicative of control information on data communication at the control field 302. The data frame generator 2 also sets a bit train indicative of actual information at the data field 303, and sets a bit train or error correction code for use of error control at the ECC field 304.

The data frame generator 2 outputs the generated data frame 300 to an error number detector 3 of the error controller 21 while finding the number of received data (data frame length) from the data frame 300 and stores it in a received data number buffer 8.

The error number detector 3, when receiving the data frame 300, performs error correcting operations over the data frame 300 with use of the error correction code set at the ECC field 304. When finding the number of errors as a result of the error correcting operation, the error number detector 3 stores the found number of errors into an error number buffer 4.

When failing to find the number of errors, the error number detector 3 issues a request to an approximation calculator 7 to cause the calculator to calculate an approximation of the number of errors.

The approximation calculator 7, when receiving the request, calculates an approximation of the number of errors present within the data frame 300 on the basis of an immediately previous error rate on the communication line stored in an error rate buffer 6 and of the number of received data (data frame length) of the data frame 300 stored in a received data number buffer 8. The approximation calculator 7 then stores the calculated value as an approximation of the number of errors into the error number buffer 4.

When the number of errors is stored in the error number buffer 4, an error rate calculator 5 calculates an error rate on the communication line on the basis of the error number of the error number buffer 4 and the number of received data (data frame length) of the data frame 300 stored in the received data number buffer 8. Then, the calculated error rate is stored into the error rate buffer 6.

In this connection, the error rate on the communication line can be calculated by dividing the number of errors by the number of received data.

After the error rate on the communication line is stored in the error rate buffer 6, the data communication protocol circuit 22 transmits the error rate to the transmitting terminal 100 via the radio circuit 25.

In the transmitting terminal 100, the radio circuit 15 receives the error rate, and the data communication protocol circuit 12 changes the set values of parameters such as the data frame length, corresponding to the error rate on the communication line. Thereafter, the data communication is carried out under the set values thus changed.

Explanation will be made next as to the operation of the error number detector 3 for error correction by using on the error correction code of the ECC field 304 of FIG. 3, while referring to a block diagram of FIG. 4.

Figure 4:
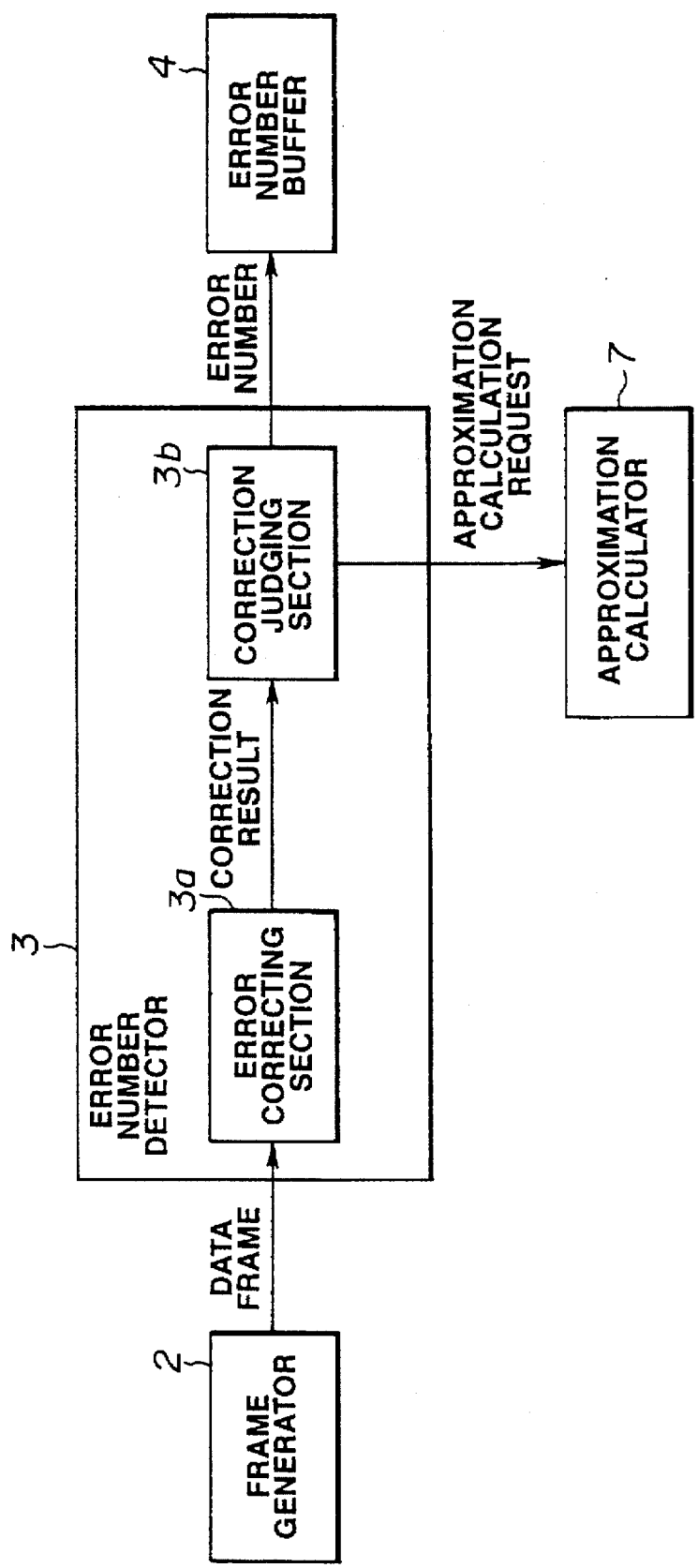
FIG. 4 is a block diagram of the error number detector of the error controller in FIG. 2.

FIG. 4 shows a detailed structure of the error number detector 3 in FIG. 2, which detector has an error correcting section 3a and a correction judging section 3b.

The error correcting section 3a, when receiving the data frame generated by the data frame generator 2, carries out error correcting operations with use of the error correction code set at the ECC field 304.

When the error correcting operation reveals that the number of errors within the data frame 300 is within the range of correction ability of the error correction code, the error correcting section 3a informs the correction judging section 3b of the corrected errors as the number of errors.

When the error correcting operation reveals that the number of errors within the data frame 300 exceeds the correction ability of the error correction code, the error correcting section 3a informs the correction judging section 3b of the effect that it is impossible to find the number of errors.

The correction judging section 3b, when informed of the number of errors by the error correcting section 3a, stores the informed number of errors into the error number buffer 4.

When informed of the impossibility of finding the number of errors by the error correcting section 3a, on the other hand, the correction Judging section 3b issues a request to the approximation calculator 7 to cause the calculator to calculate an approximation of the number of errors.

Next, detailed explanation will be made as to the operation of the approximation calculator 7 for an approximation of the number of errors in response to the request from the error number detector 3, while referring to a block diagram of FIG. 5.

Figure 5:
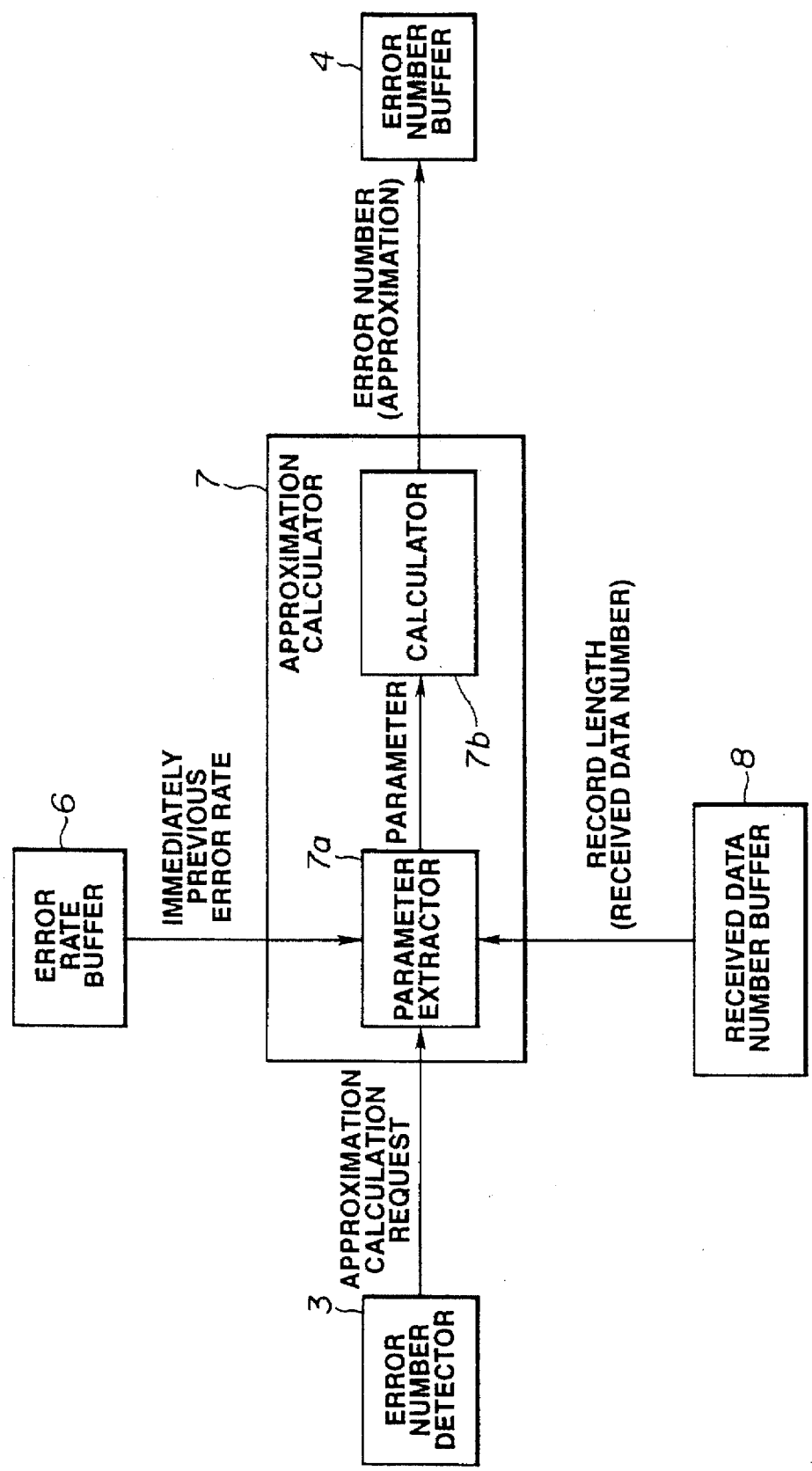
FIG. 5 is a block diagram of the approximation calculator of the error controller in FIG. 2.

Referring to FIG. 5, the approximation calculator 7 is made up of a parameter extractor 7a and a calculator 7b.

The parameter extractor 7a, for the purpose of calculating an approximation of the number of errors, extracts the immediately previous error rate on the communication line stored in the error rate buffer 6, and the number of received data (data frame length) of the data frame 300 from the received data number buffer 8. The parameter extractor 7a outputs the extracted error rate and the number of received data on the communication line to the calculator 7b.

The calculator 7b calculates an approximation of the number of errors on the basis of the error rate and the number of received data (data frame length) output from the parameter extractor 7a.

Assuming that the communication line has an error rate p and the number of received data (data frame length) is f bits, then an approximation (expectation) Ne for occurrence of the number of errors which exceeds the correction abilities of n bits can be found in accordance with the following equation.

$$Ne = \sum_{k=n+1}^{f} k \times (Pk/Pe)$$

where, Pk is a probability of k-bit error occurrence in a data frame having f-bit frame length and is expressed as follows.

$$Pk = {}_fC_k p^k (1-p)^{f-k}$$

and Pe is a probability of error occurrence of n+1 bits or more in a data frame having f-bit frame length and is expressed as follows.

$$Pe = 1 - \sum_{k=0}^{n} Pk$$

The calculator 7b stores the calculated approximation in the error number buffer 4.

Figure 6:
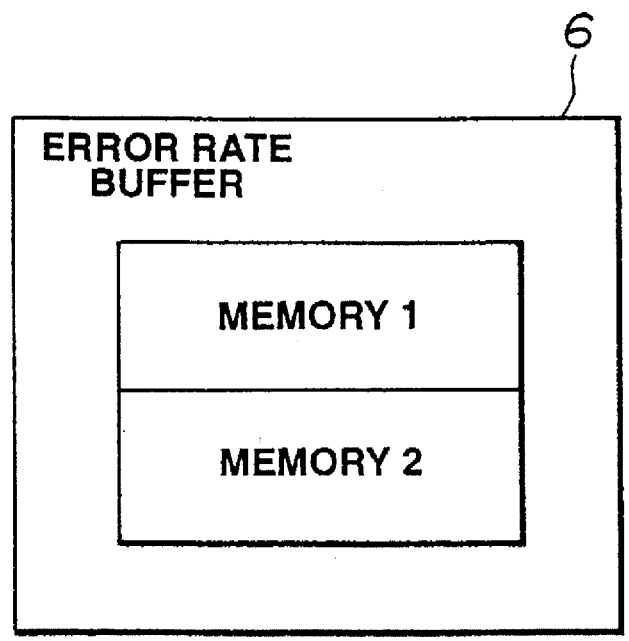
FIG. 6 is a block diagram of the error rate buffer of the error controller in FIG. 2.

Referring to FIG. 6, the error rate buffer 6 for storing the error rate comprises memories 1 and 2. The memory 1 stores the immediately previous error rate on the communication line, while the memory 2 stores the current error rate calculated by the error rate calculator 5. That is, when the error rate on the communication line is calculated by the error rate calculator 5, the calculated error rate is stored in the memory 2 while the error rate stored previously 2 is stored in the memory 1 as the immediately-previous error rate.

In the embodiment described above, the error rate on the communication line is transmitted to the transmitting terminal 100 through the radio circuit 25 and the data communication protocol circuit 12 of the transmitting terminal 100 changes the set values of parameters such as frame length according to the received error rate.

Alternatively, it may be so arranged that the data communication protocol circuit 22 of the receiving terminal 200 obtains the values of parameters including frame length according to the error rate, and transmits the parameter values to the transmitting terminal 100, and the data communication protocol circuit 12 of the transmitting terminal 100 changes the set values of parameters including frame length on the basis of the received parameter values.

As mentioned earlier, there are two types of data errors on the communication line, that is, burst errors which generate in a predetermined period and random errors which generate regularly.

The prior art data communication system could not distinguish the burst and random errors from each other. Therefore, the parameter values including data frame length were changed by the burst error, and thus the optimum parameter values could not be set.

Figure 7:
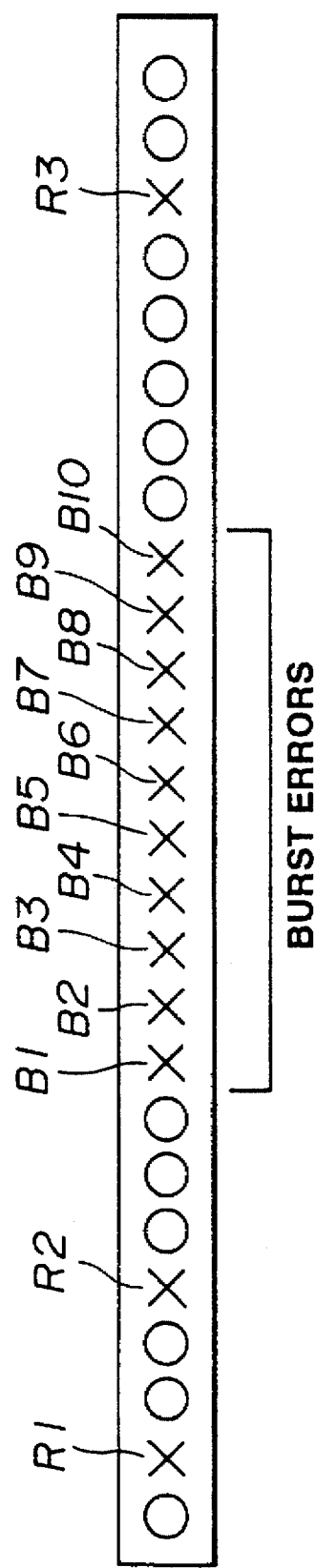
FIG. 7 shows an example of data errors generated in a communication line.

FIG. 7 shows an example of data errors, in which symbol "()" represents correct data and symbol "x" represents wrong data.

More precisely, in FIG. 7, the data errors include random errors R1, R2 and R3 which occur regularly and burst errors B1 to B10 which occur continually in a fixed period of time. In the illustrated example, since the burst errors B1 to B10 generate on a non-regular basis, when the parameter values including data frame length are changed while taking the burst errors B1 to B10 into consideration, the optimum parameter values cannot be set.

Figure 8:
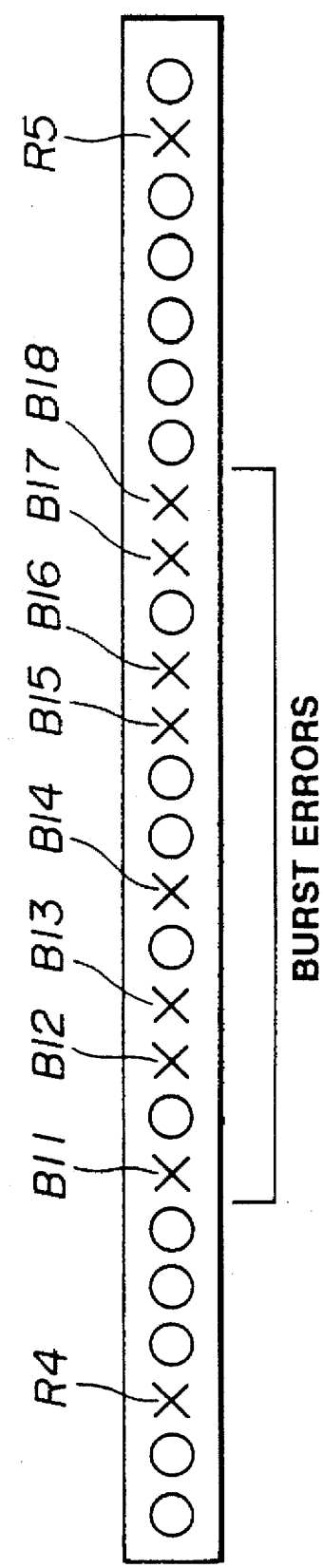
FIG. 8 shows another example of the data errors generated in the communication line.

FIG. 8 shows another example of the data errors, in which, as in FIG. 7, symbol "0" represents correct data and symbol "x" represents wrong data. Also in this case, the data errors include random errors R4 and R5 which occur regularly and burst errors B11 to B18 which occur more than a certain number in a fixed period of time. When the parameter values including data frame length are changed while taking the burst errors B11 to B18 into consideration, the optimum parameter values cannot be set.

In accordance with a second embodiment of the present invention, the error number detector 3 Shown in FIG. 2 detects the burst and random errors distinctively.

Figure 9:
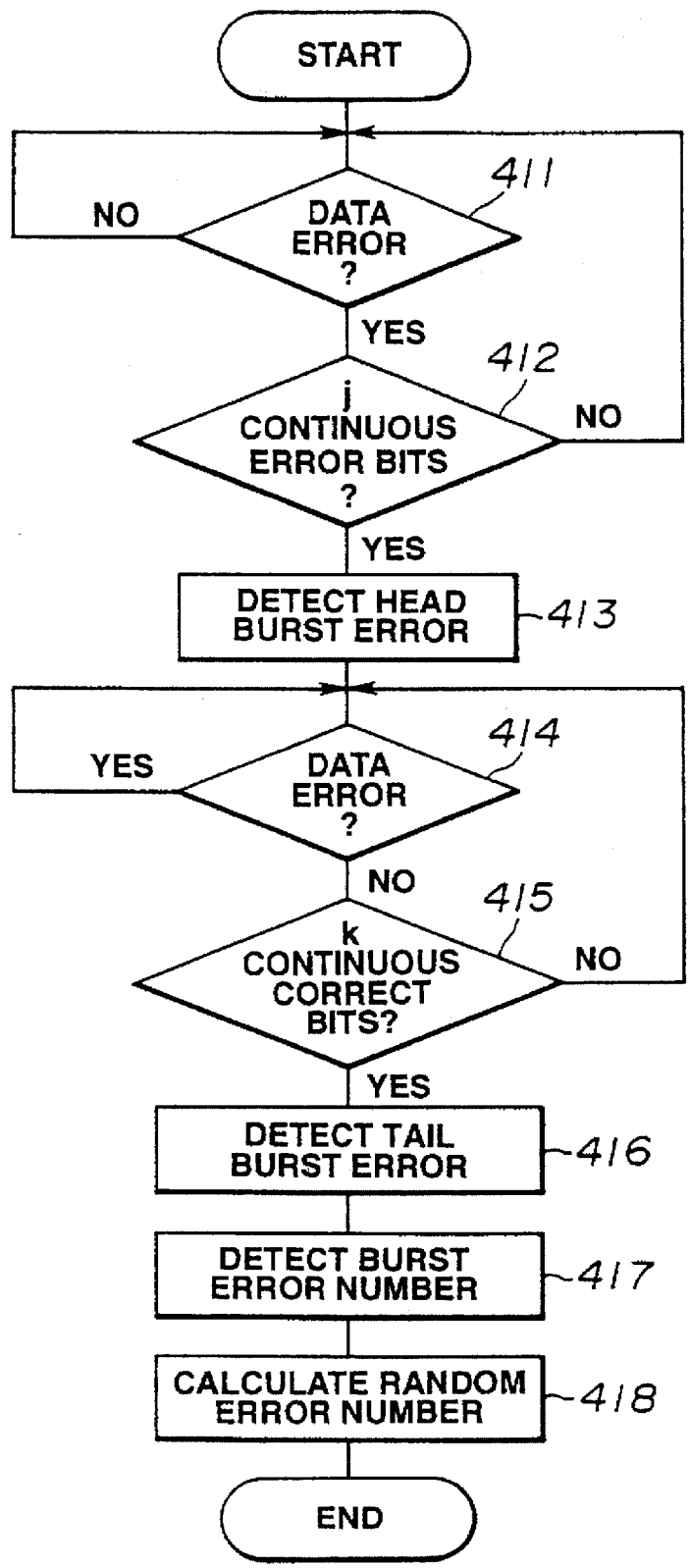
FIG. 9 is a flowchart illustrating an example of the random error number detecting steps preformed by the error number detector.

FIG. 9 shows a flowchart for explaining an example of the random error number detecting operation of the error number detector 3 in FIG. 2.

Incidentally, the burst errors generated on the communication line have the following properties 1) and 2).

1) Generate on a non-regular basis.
2) Generate continually or intensively in a predetermined period of time.

By utilizing the burst error properties, in the operation of the flowchart of FIG. 9, the system first finds a burst error duration where burst errors take place, calculates the number of errors, i.e., a burst error number within the burst error duration, and then finds a random error number by subtracting the burst error number from a total error number.

More in detail, the system first examines the presence or absence of an error in received data (step 411). In the absence of any error ("NO" in the step 411), the system returns to the start point of the step 411, whereas, in the presence of an error ("YES" in the step 411), the system examines whether or not the error continues by a predetermined number j bits (step 412).

When the error does not continue by the j bits ("NO" in the step 412), the system returns to the start point of the step 411.

When determining at the step 412 that the error continues by j bit ("YES" in the step 412), the system detects the error as head of the continual burst errors, or the head of the burst error duration (step 413).

In the burst error duration, the system examines whether or not it is an error bit (step 414). If the bit is a data error ("YES" in the step 414), the system returns to the start point of the step 414.

When determining at the step 414 that the bit is not a data error, i.e., a correct data bit ("NO" in the step 414), the system examine whether or not the correct data bit continues by a predetermined number k bits (step 415).

When determining that the correct data bit does not continue by the k bits ("NO" in the step 415), the system returns to the start point of the step 414.

When determining that the correct data bit continues by the k bits ("YES" in the step 415), the system judges the end of the burst errors or the burst error duration (step 416).

Next, the system obtains the burst error duration on the basis of the head burst error bit detected at the step 413 and the tail burst error bit detected at the step 416, and calculates a burst error number corresponding to the number of error bits within the burst error duration (step 417).

Subsequently, the system calculates a random error number by subtracting the burst error number calculated at the step 417 from a total error number separately calculated.

With such an arrangement, since an error rate can be calculated on the basis of the number of errors excluding the burst errors, the optimum parameter values can be changed independently of the burst errors.

Although the parameter values for data of a frame structure transmitted from the transmitting terminal 100 have been changed according to the error rate in the foregoing embodiment, the parameter values for data of a frame structure transmitted from the transmitting terminal 100 may be changed as necessary according to the error rate detected by the error number detector 3 of FIG. 2, for example, according to the aforementioned random error number.

Figure 10:
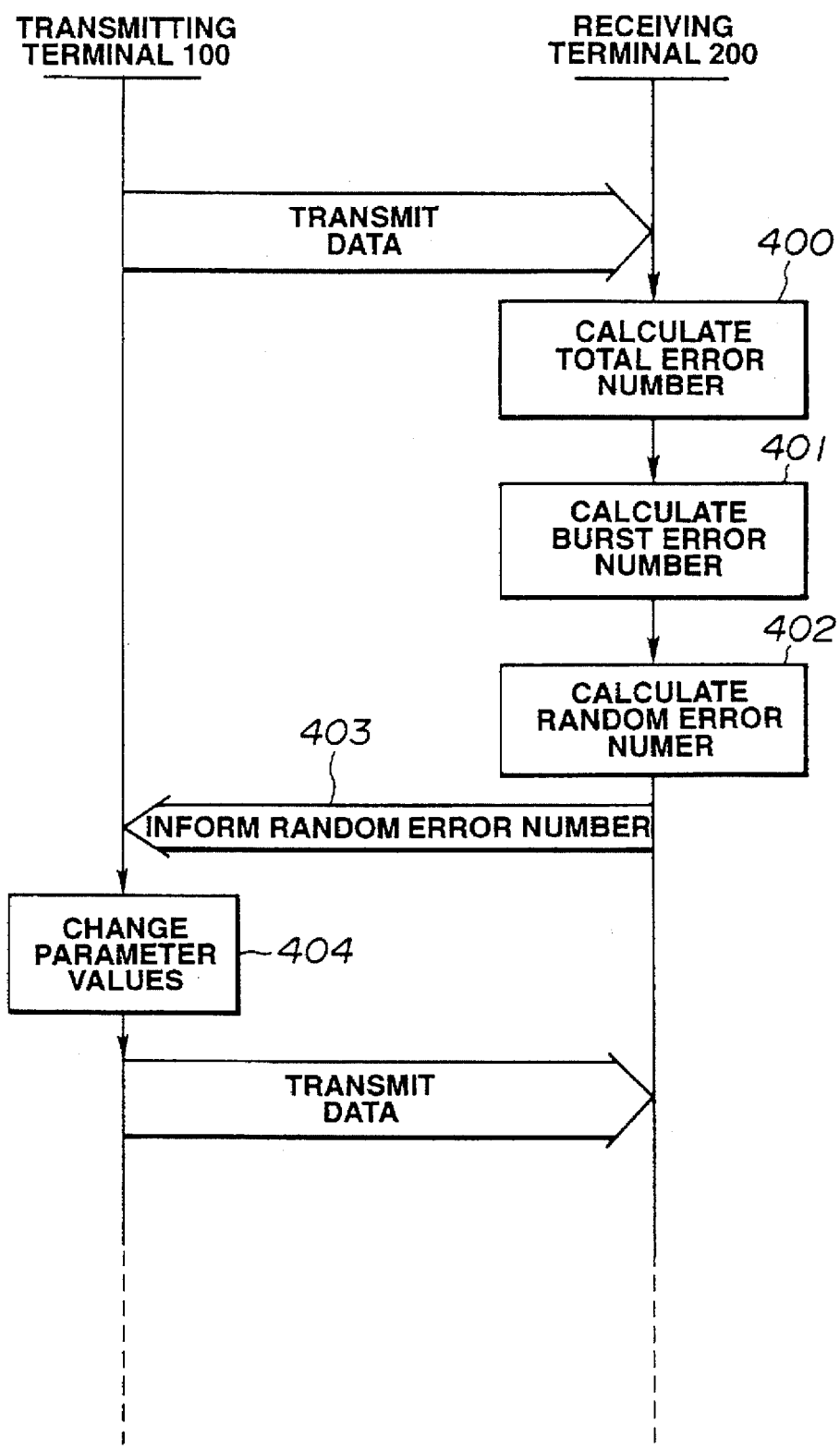
FIG. 10 is a sequence chart illustrating the operation of another embodiment of the present invention in which the receiving terminal detects a random error number and transmits the detected random error number to the transmitting terminal to change the set values of parameters in data of a frame structure to be transmitted from the transmission side terminal.

FIG. 10 shows a third embodiment of the present invention wherein the receiving terminal 200 detects a random error number and transmits it to the transmitting terminal 100 to change the set parameter values of data of a frame structure transmitted from the transmitting terminal 100.

In FIG. 10, when the receiving terminal 200 receives the frame-structured data from the transmitting terminal 100, the terminal 200 first calculates the number of errors (total error number) including both of the burst and random errors. (step 400).

The receiving terminal 200 then calculates a burst error number from the received data (step 401). Subsequently, the terminal 200 calculates a random error number by subtracting the burst error number calculated at the step 401 from the total error number calculated at the step 400 (step 402).

Next, the receiving terminal 200 transmits the random error number calculated at the step 402 to the transmitting terminal 100 (step 403). The transmitting terminal 100, when receiving the random error number, changes the parameter values in an error control system during the data communication to optimum values for the random errors on the basis of the random error number (step 404).

Then, the data communication is resumed with the parameter values changed at the transmitting terminal 100.

Figure 11:
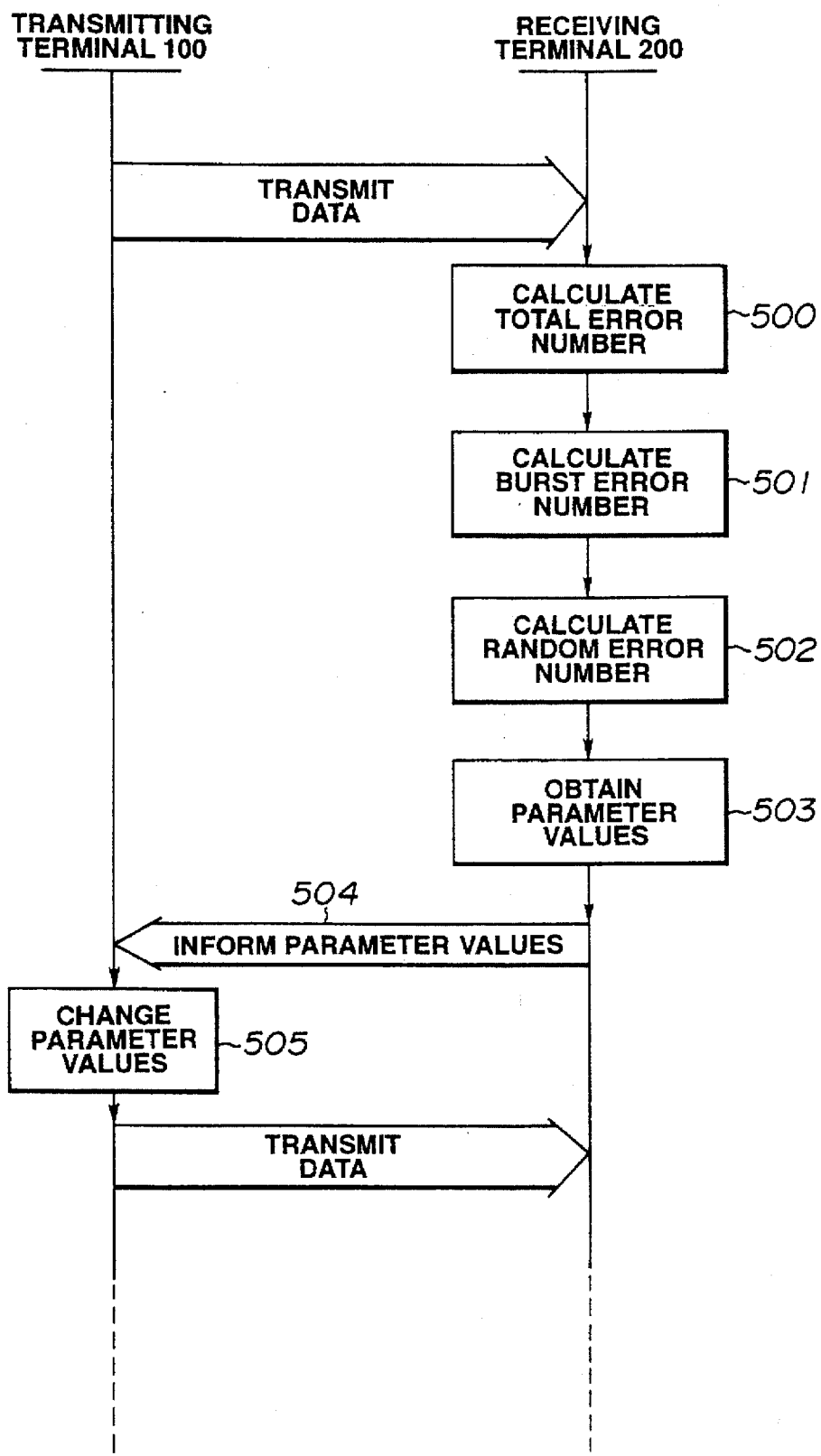
FIG. 11 is a sequence chart illustrating the operation of yet another embodiment of the present invention in which the receiving terminal obtains the values of parameters and informs the transmitter side of the obtained found parameter values.

FIG. 11 shows yet another embodiment of the present invention wherein the aforementioned parameter values are found by the receiving terminal 200 and are informed to the transmitting terminal 100.

In FIG. 11, when receiving data of a frame structure from the transmitting terminal 100, the receiving terminal 200 calculates the number of errors (total error number) including both burst and random errors from the received data (step 500).

The terminal 200 calculates a burst error number from the received data (step 501), and then calculates a random error number by subtracting the burst error number calculated at the step 501 from the total error number calculated at the step 500 (step 502).

After this, the receiving terminal 200 finds parameter values in the error control system during the data communication according to the random error number calculated at the step 502 (step 503), and then transmits the parameter values to the transmitting terminal 100 (step 504).

The transmitting terminal 100, when receiving the parameter values, changes the parameter values in the error control system during the data communication to the found parameter values (step 505). Then, the data communication is resumed with the parameter values changed at the transmitting terminal.

Although the random error number is informed to the transmitting terminal in the step 403 of the foregoing embodiment of FIG. 10, the random error number may be replaced by a value indicative of the similar meaning, e.g., by the error rate.

What is claimed is:

1. A data communication system comprising a transmitting terminal for transmitting data of a frame structure, and a receiving terminal connected to the transmitting terminal through a communication line, for receiving the frame-structured data from the transmitting terminal, the receiving terminal comprising:

error number detection means for detecting the number of data errors from the frame-structured data received from the transmitting terminal; and error number estimation means for estimating the number of data errors when the error number detection means fails to detect the number of data errors, and the transmitting terminal comprising:

parameter change means for changing parameters of the frame-structured data on the basis of the detected number of data errors when the error number detection means detects the number of data errors or on the basis of the number of data errors estimated by the error number estimation means when the error number detection means fails to detect the number of data errors.

2. A data communication system as set forth in claim 1, wherein the communication line is radio communication channels.

3. A data communication system as set forth in claim 1, wherein the error number estimation means estimates the number of data errors on the basis of an error rate of data previously received when the error number detection means fails to detect the number of data errors.

4. A data communication system as set forth in claim 1, wherein the error number estimation means comprises:

error rate memory means for storing an error rate of data previously received; and error number estimation means for estimating the number of data errors on the basis of the error rate of the previously-received data stored in the error rate memory means when the error number detection means fails to detect the number of data errors.

5. A data communication system as set forth in claim 1, wherein the receiving terminal further comprises:

error rate calculation means for calculating an error rate on the basis of the detected number of data errors when the error number detection means detects the number of data errors, and for calculating the data error rate on the basis of the number of data errors estimated by the error number estimation means when the error number detection means fails to detect the number of data errors; and error rate transmission means for transmitting the data error rate calculated by the error rate calculation means to the transmitting terminal, and wherein the parameter change means comprising means for changing parameters of data to be transmitted on the basis of the error rate of the data transmitted from the error rate transmission means.

6. A data communication system as set forth in claim 1, wherein the receiving terminal further comprises:

error rate calculation means for calculating a data error rate on the basis of the number of data errors when the error number detection means detects the number of data errors, and for calculating the data error rate on the basis of the number of data errors estimated by the error number estimation means when the error number detection means fails to detect the number of data errors;

parameter calculation means for calculating parameter values of data of the frame structure to be transmitted from the transmitting terminal on the basis of the data error rate calculated by the error rate calculation means; and parameter transmission means for transmitting the parameter values calculated by the parameter calculation means to the transmitting terminal, and wherein the parameter change means comprises means for changing parameters of data to be transmitted from the transmitting terminal on the basis of the parameter values transmitted from the parameter transmission means.

7. A data communication system as set forth in claim 1, wherein the error number detection means comprises random error detection means for detecting the number of random errors excluding burst errors from the frame-structured data received from the transmitting terminal, and wherein the parameter change means comprises means for changing parameters of data of the frame structure to be transmitted on the basis of the random error number detected by the random error detection means.

8. A data communication system as set forth in claim 7, wherein the random error detection means comprises:

total error number calculation means for calculating a total error number from the frame-structured data received from the transmitting terminal;

burst error calculation means for calculating the number of burst errors from the frame-structured data received from the transmitting terminal; and random error calculation means for calculating the random error number by subtracting the burst error number calculated by the burst error calculation means from the total error number calculated by the total error number calculation means.

9. A data communication system as set forth in claim 8, wherein the burst error calculation means detects start of burst error when a predetermined number of error bits are successively detected in the frame-structured data received from the transmitting terminal, detects end of the burst error when a predetermined number of correct bits in the frame-structured data successively detected, and determines the number of error bits within a duration from the start of burst error to the end of the burst error as the burst error number.

10. A data communication system comprising a transmitting terminal for transmitting data of a frame structure, and a receiving terminal connected to the transmitting terminal through a communication line, for receiving the frame-structured data from the transmitting terminal, the receiving terminal comprising random error detection means for detecting random errors excluding burst errors from the frame-structure data received from the transmitting terminal, the transmitting terminal comprising parameter change means for changing parameters of data of the frame structure to be transmitted on the basis of the random errors detected by the random error detection means of the receiving terminal.

11. A data communication system as set forth in claim 10, wherein the communication line is radio communication channels.

12. A data communication system as set forth in claim 10, wherein the random error detection means comprises:

total error number calculation means for calculating a total error number from the frame-structured data received from the transmitting terminal;

burst error calculation means for calculating the number of burst errors from the frame-structured data received from the transmitting terminal; and random error calculation means for calculating the random error number by subtracting the burst error number calculated by the burst error calculation means from the total error number calculated by the total error number calculation means.

13. A data communication system as set forth in claim 12, wherein the burst error calculation means detects start of burst error when a predetermined number of error bits are successively detected in the frame-structured data received from the transmitting terminal, detects end of the burst error when a predetermined number of correct bits in the frame-structured data successively detected, and determines the number of error bits within a duration from the start of burst error to the end of the burst error as the burst error number.

14. A data communication system as set forth in claim 12, wherein the receiving terminal further comprises burst error number transmission means for transmitting the burst error number calculated by the random error calculation means to the transmitting terminal, and wherein
the parameter change means comprises:
burst error number reception means for receiving the burst error number transmitted by the burst error number transmission means;
parameter calculation means for calculating parameter values of data of the frame structure transmitted from the transmitting terminal on the basis of the burst error number received by the burst error number reception means; and
change means for changing parameters of the frame-structured data transmitted by the transmitting terminal on the basis of the parameter values calculated by the parameter calculation means.

15. A data communication system as set forth in claim 12, wherein the receiving terminal further comprises:
parameter calculation means for calculating parameter values of data of the frame structure transmitted from the transmitting terminal on the basis of the burst error number calculated by the random error number calculation means; and
parameter transmission means for transmitting the parameter values calculated by the parameter calculation means to the transmitting terminal, and wherein
the parameter change means comprises means for changing the parameters of the frame-structured data transmitted from the transmitting terminal on the basis of the parameter values transmitted by the parameter transmission means.

16. A data communication method in a data communication system for performing communication of data of a frame structure between a first terminal of a data transmitter side and a second terminal of a data receiver side through a communication line, the method comprising, in the first terminal, the steps of:
detecting the number of data errors in the frame-structured data transmitted from the transmitting terminal; and
estimating the number of data errors from an error rate of data previously received when the number of data errors is not detected, and
comprising, in the second terminal, the step of:
changing parameters of data of the frame structure to be transmitted on the basis of the detected number of data errors when the number of data errors is detected by the receiving second and on the basis of the estimated number of data errors when the number of data errors is not detected by the receiving second.

17. A data communication method in a data communication system for performing communication of data of a frame structure between a first terminal of a data transmitter side and a second terminal of a data receiver side through a communication line, the method comprising the steps of:
detecting a random error number by subtracting the number of burst errors generated on a burst basis from the total number of errors generated in the frame-structured data transmitted from the first terminal to the second terminal; and
changing parameters of the frame-structured data, in the first terminal, on the basis of the random error number detected at the second terminal.

18. A data communication apparatus for transmitting and receiving data of a frame structure through a communication line, comprising:
data reception means for receiving the frame-structured data;
error number detection means for detecting the number of data errors from the frame-structured data received by the data reception means;
error number estimation means for estimating the number of data errors when the error number detection means fails to detect number of data errors; and
parameter change means for changing parameters of the frame-structured data on the basis of the detected number of data errors when the error number detection means successfully detects the number of data errors and on the basis of the number of data errors estimated by the error number estimation means when the error number detection means fails to detect the number of data errors.

19. A data communication apparatus as set forth in claim 18, wherein the communication line is radio communication channels.

20. A data communication apparatus as set forth in claim 18, wherein the error number estimation means estimates the number of data errors on the basis of an error rate of data previously received when the error number detection means fails to detect the number of data errors.

21. A data communication apparatus as set forth in claim 18, wherein the error number estimation means comprises:
error number memory means for storing an error rate of data previously received; and
error number estimation means for estimating the number of data errors on the basis of the error rate of the previously-received data stored in the error number memory means when the error number detection means fails to detect the number of data errors.

22. A data communication apparatus as set forth in claim 18, further comprising:
error rate calculation means for calculating the data error rate on the basis of the detected number of data errors when the error number detection means detects the number of data errors and for calculating the data error rate on the basis of the number of data errors estimated by the error number estimation means when the error number detection means fails to detect the number of data errors; and
error rate transmission means for transmitting a data error rate calculated by the error rate calculation means, and wherein the parameter change means comprising means for changing parameters of data to be transmitted on the basis of the error rate of the data transmitted from the error rate transmission means.

23. A data communication apparatus as set forth in claim 18, further comprising:
error rate calculation means for calculating a data error rate on the basis of the detected number of data errors when the error number detection means detects the number of data errors and for calculating the data error rate on the basis of the number of data errors estimated by the error number estimation means when the error number detection means fails to detect the number of data errors;

parameter calculation means for calculating parameter values of the received data of the frame structure on the basis of the data error rate calculated by the error rate calculation means; and parameter transmission means for transmitting the parameter values calculated by the parameter calculation means, and wherein the parameter change means comprises means for changing parameters of data to be transmitted from the transmitting terminal on the basis of the parameter values transmitted from the parameter transmission means.

24. A data communication apparatus as set forth in claim 18, wherein the error number detection means comprises random error detection means for detecting the number of random errors excluding burst errors from the receive frame-structured data, and wherein the parameter change means comprises means for changing parameters of data of the frame structure to be transmitted on the basis of the random error number detected by the random error detection means.

25. A data communication apparatus as set forth in claim 24, wherein the random error detection means comprises:

total error number calculation means for calculating a total error number from the received frame-structured data;

burst error calculation means for calculating the number of burst errors from the received frame-structured data; and random error calculation means for calculating the random error number by subtracting the burst error number detected by the burst error calculation means from the total error number calculated by the total error number calculation means.

26. A data communication apparatus as set forth in claim 25, wherein the burst error calculation means detects start of burst error when a predetermined number of error bits are successively detected in the received frame-structured data, detects end of the burst error when a predetermined number of correct bits in the received frame-structured data successively detected, and determines the number of error bits within a duration from the start of burst error to the end of the burst error as the burst error number.

27. A data communication apparatus for transmitting and receiving data of a frame structure through a communication line, comprising:

data receiving means for receiving the frame-structured data;

random error detection means for detecting random errors excluding burst errors from the frame-structure data received at the data receiving means; and parameter change means for changing parameters of data of the frame structure to be transmitted on the basis of the random errors detected by the random error detection means.

28. A data communication apparatus as set forth in claim 27, wherein the communication line is radio communication channels.

29. A data communication apparatus as set forth in claim 27, wherein the random error detection means comprises:

total error number calculation means for calculating a total error number from the received frame-structured data;

burst error calculation means for calculating the number of burst errors from the received frame-structured data; and random error calculation means for calculating the random error number by subtracting the burst error number detected by the burst error calculation means from the total error number calculated by the total error number calculation means.

30. A data communication apparatus as set forth in claim 29, wherein the burst error calculation means detects start of burst error when a predetermined number of error bits are successively detected in the received frame-structured data, detects end of the burst error when a predetermined number of correct bits in the received frame-structured data successively detected, and determines the number of error bits within a duration from the start of burst error to the end of the burst error as the burst error number.

31. A data communication apparatus as set forth in claim 29, further comprising burst error number transmission means for transmitting the burst error number calculated by the random error calculation means to a transmitting terminal, and wherein the parameter change means comprises:

burst error number reception means for receiving the burst error number transmitted by the burst error number transmission means;

parameter calculation means for calculating parameter values of the received data of the frame structure on the basis of the burst error number received by the burst error number reception means; and change means for changing parameters of the received frame-structured data on the basis of the parameter values calculated by the parameter calculation means.

32. A data communication apparatus as set forth in claim 29, further comprising:

parameter calculation means for calculating parameter values of the received data of the frame structure on the basis of the burst error number calculated by the random error number calculation means; and parameter transmission means for transmitting the parameter values calculated by the parameter calculation means, and wherein the parameter change means comprises means for changing the parameters of the received frame-structured data on the basis of the parameter values transmitted by the parameter transmission means.

* * * * *